US011242991B2

United States Patent
Clark et al.

(10) Patent No.: US 11,242,991 B2
(45) Date of Patent: Feb. 8, 2022

(54) CMC COMPONENT ARRANGEMENT AND METHOD OF MANUFACTURE

(71) Applicant: United Technologies Corporation, Farmington, CT (US)

(72) Inventors: Thomas E. Clark, Sanford, ME (US); Kathryn S. Read, Marlborough, CT (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 96 days.

(21) Appl. No.: 16/413,174

(22) Filed: May 15, 2019

(65) Prior Publication Data

US 2020/0363063 A1 Nov. 19, 2020

(51) Int. Cl.

*C04B 35/80* (2006.01)
*F23R 3/00* (2006.01)
*C04B 35/628* (2006.01)

(52) U.S. Cl.

CPC ........ *F23R 3/007* (2013.01); *C04B 35/62844* (2013.01); *C04B 35/80* (2013.01); *C04B 2235/3826* (2013.01); *C04B 2235/5256* (2013.01); *C04B 2235/6028* (2013.01); *C04B 2235/612* (2013.01); *F23R 2900/00017* (2013.01)

(58) Field of Classification Search

CPC ............ F23R 3/007; F23R 2900/00017; F23R 2900/00012; F23R 2900/00018; F05D 2260/36; F05D 2240/11; F05D 2300/6033; F01D 25/246; C04B 35/80; C04B 35/62844; C04B 2235/5256; Y02T 50/60; B32B 18/00

See application file for complete search history.

(56) References Cited

U.S. PATENT DOCUMENTS

| | | | | |
|---|---|---|---|---|
| 3,041,562 A * | 6/1962 | Gammel, Sr. | H01F 38/12 | 336/96 |
| 3,370,734 A | 2/1968 | Wilkens et al. | | |
| 3,399,095 A | 8/1968 | Hyland, Jr. | | |
| 6,221,297 B1 * | 4/2001 | Lanoue | B29C 70/70 | 264/219 |
| 6,930,579 B2 * | 8/2005 | Radford | H01F 41/125 | 336/206 |
| 7,023,312 B1 * | 4/2006 | Lanoue | H01F 27/085 | 336/60 |

(Continued)

OTHER PUBLICATIONS

International Search Report and Written Opinion for International Application No. PCT/US20/32897 dated Sep. 28, 2020.

(Continued)

*Primary Examiner* — Noah S Wiese

(74) *Attorney, Agent, or Firm* — Carlson, Gaskey & Olds, P.C.

(57) ABSTRACT

A method of manufacturing a component includes forming an inner wrap about a mandrel. The inner wrap has first and second walls joined by a base portion and an outer wall. A rod is arranged at each of the first and second walls. An outer wrap is formed about the inner wrap and the rods to form a body. Features are formed in the first and second walls.

20 Claims, 6 Drawing Sheets

22 15 20 B 42 C 44 24 26 57 28 46 52 32 56 54 59 A 48 38 50 38 40 30 36

(56) References Cited

U.S. PATENT DOCUMENTS

| | | | | |
|---|---|---|---|---|
| 8,111,123 | B2 * | 2/2012 | Lim | H01F 27/322 336/55 |
| 9,079,245 | B2 | 7/2015 | Durocher et al. | |
| 10,024,193 | B2 | 7/2018 | Shapiro | |
| 2015/0000259 | A1 | 1/2015 | Dietz | |
| 2015/0053293 | A1 | 2/2015 | Ophaug | |
| 2015/0372539 | A1 * | 12/2015 | Livadaras | H02J 13/0079 700/297 |
| 2017/0328228 | A1 | 11/2017 | Ruthemeyer et al. | |
| 2018/0230839 | A1 | 8/2018 | Gallier et al. | |

OTHER PUBLICATIONS

International Preliminary Report on Patentability for International Application No. PCT/US20/32897 dated Nov. 25, 2021.

* cited by examiner

CMC COMPONENT ARRANGEMENT AND METHOD OF MANUFACTURE

BACKGROUND

This application relates to a ceramic matrix composite component and method of manufacture.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Air flowing through the combustor and turbine has very high temperatures. Some of the components in these high temperature areas, such as the combustor segments and the blade outer air seals have been proposed made of ceramic matrix composite fiber layers.

SUMMARY

In one exemplary embodiment, a method of manufacturing a component includes forming an inner wrap about a mandrel. The inner wrap has first and second walls joined by a base portion and an outer wall. A rod is arranged at each of the first and second walls. An outer wrap is formed about the inner wrap and the rods to form a body. Features are formed in the first and second walls.

In a further embodiment of the above, the method includes removing the mandrel and the rods.

In a further embodiment of any of the above, the method includes densifying the body.

In a further embodiment of any of the above, the densifying comprises injecting an infiltrant into the body to fill voids formed by the rods.

In a further embodiment of any of the above, the method includes machining the body to form a blade outer air seal segment.

In a further embodiment of any of the above, the machining comprises removing at least 50% of the outer wall.

In a further embodiment of any of the above, the machining includes removing a portion of the first and second walls to form a trailing edge platform.

In a further embodiment of any of the above, the machining is performed by an ultrasonic machine.

In a further embodiment of any of the above, the inner and outer wraps are formed from fibrous braided or woven plies.

In a further embodiment of any of the above, the inner wrap is formed from at least two plies.

In a further embodiment of any of the above, the body has between 5 and 15 plies.

In a further embodiment of any of the above, the rods extend along an axial length of the first and second walls.

In a further embodiment of any of the above, one rod is arranged at the first wall and configured to form a protrusion. Two rods are arranged at the second wall and configured to form a groove.

In a further embodiment of any of the above, each of the rods has a diameter of at least 0.040 inches (1.016 mm).

In a further embodiment of any of the above, the body is formed from a ceramic matrix composite material.

In a further embodiment of any of the above, at least one of the rods comprises an inner rod and an outer rod. The outer rod is removed before the step of forming features in the first and second walls.

In another exemplary embodiment, a gas turbine engine includes a compressor section, a combustor section, and a turbine section arranged about an axis of rotation. An assembly has a plurality of segments arranged circumferentially about the axis of rotation. At least one of the segments is formed of an inner wrap and an outer wrap defining first and second walls joined by a base portion and an outer wall. The outer wrap forms a protrusion or a groove at each of the first and second walls.

In a further embodiment of any of the above, at least one segment has a protrusion at the first wall and a groove at the second wall formed by the outer wrap.

In a further embodiment of any of the above, the protrusion or groove is configured to engage with an adjacent segment.

In a further embodiment of any of the above, at least one segment is a ceramic matrix composite material.

DETAILED DESCRIPTION

Figure 1:
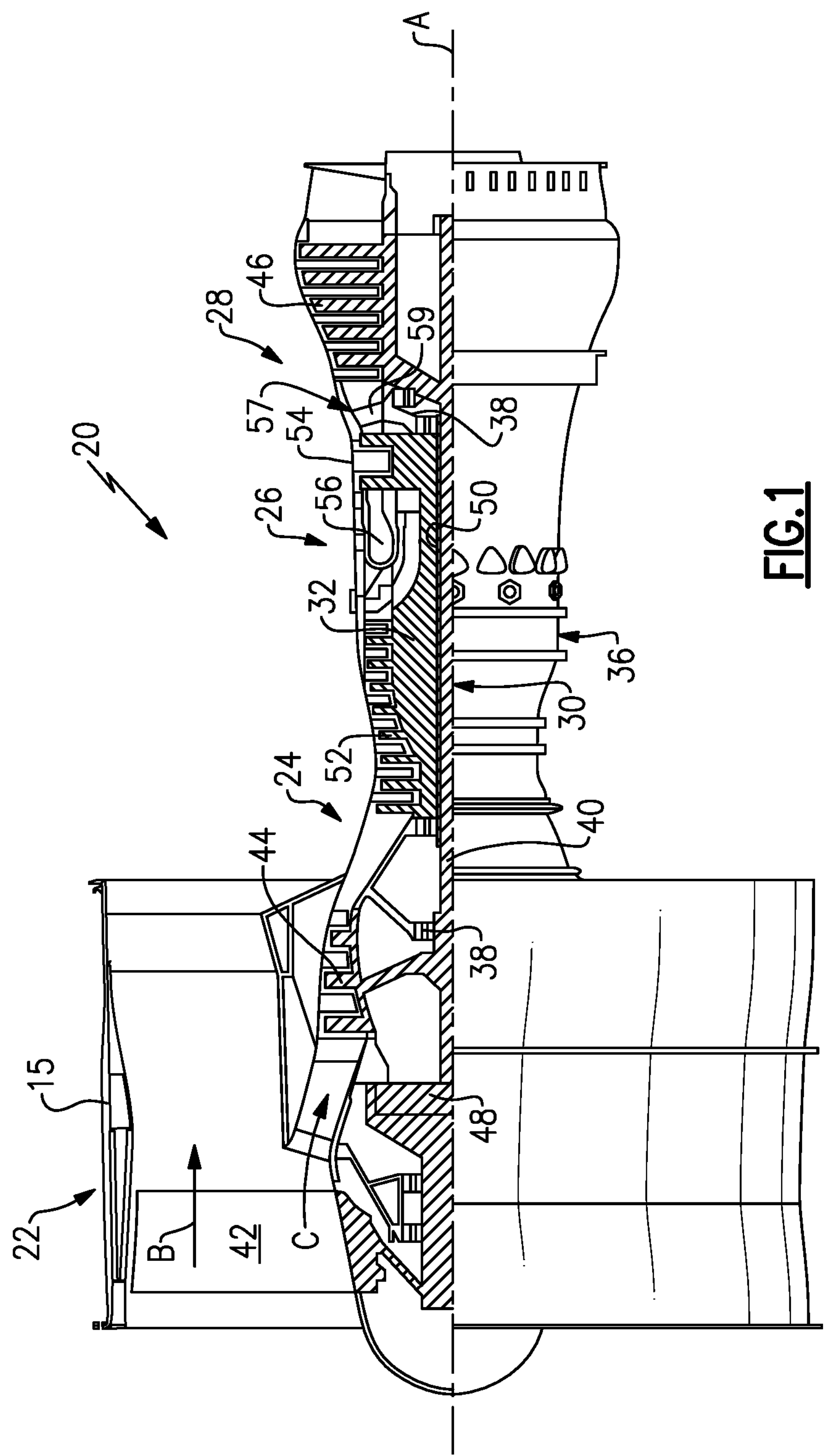
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
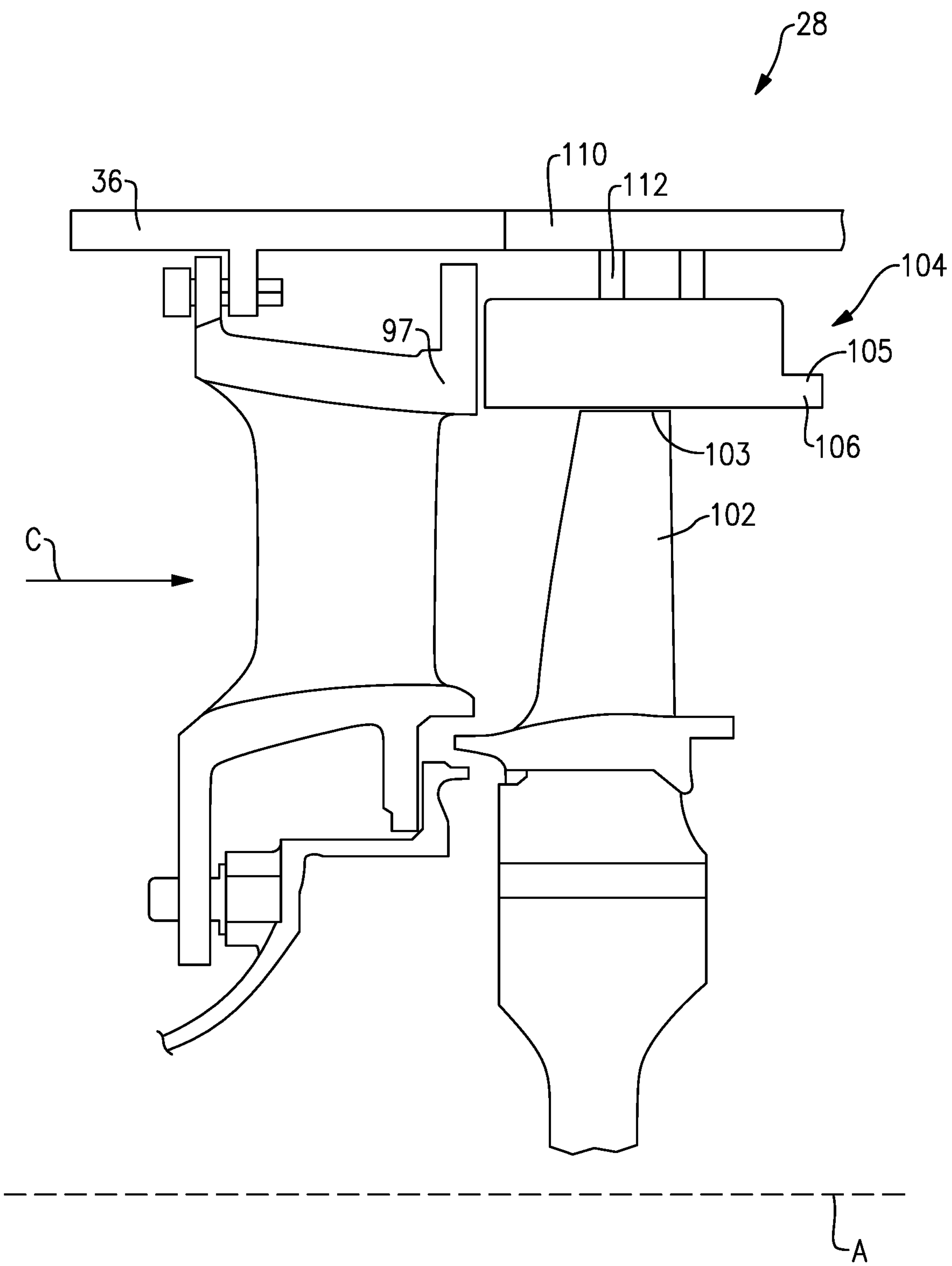
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 and/or a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102. Although a BOAS 106 is described, this disclosure may apply to other components, such as a combustor, inlet, exhaust nozzle, or vane, for example.

Figure 3:
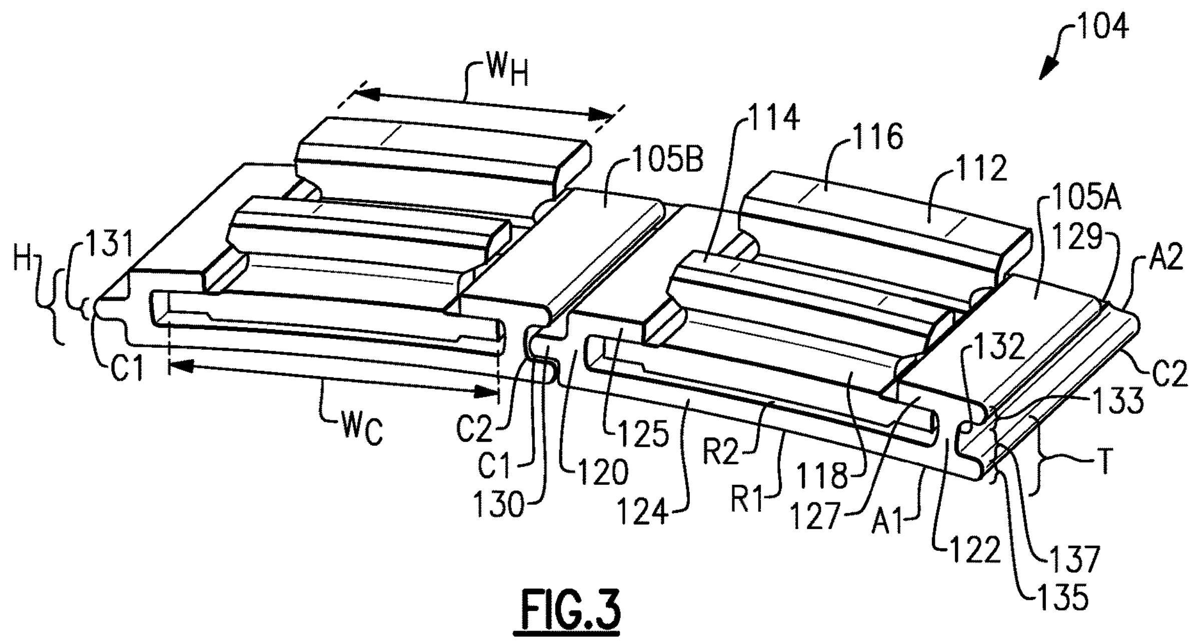
FIG. 3 shows a portion of an exemplary blade outer air seal assembly.

FIG. 3 shows a portion of an example BOAS assembly 104. The assembly 104 includes seal segments 105A, 105B mounted on carriers 112. Each seal segment 105A, 105B is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). In one example, the seal segments 105A, 105B are arranged in the turbine section 28 such that the blades 102 pass from the first circumferential side C1 to the second circumferential side C2, or left to right in the illustrated embodiment.

In the illustrated example, each BOAS segment 105 includes a first wall 120 and a second wall 122 that extend radially outward from a base portion 124. The first and second walls 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 120, 122, and provides a surface for sealing of the BOAS first and second axial sides A1, A2. For example, the base portion 124 includes a portion 129 axially aft of the first and second walls 120, 122 for sealing the trailing edge. That is, the walls 120, 122 may extend less than the full length of the seal segment 105 in the axial direction.

The walls 120, 122 include hooks 125, 127, respectively at a radially outermost portion. The hooks 125, 127 extend circumferentially inward towards one another. The hooks 125, 127 are configured to secure the seal segment 105 to the carrier 112. The hooks 125, 127 extend towards the mate-faces, or first and second circumferential sides C1, C2.

The carrier 112 has a platform 118 with axially extending hooks 114, 116. The hooks 114, 116 extend radially outward from the platform 118 for attaching the carrier 112 and seal segment 105 to the support structure 110 (shown in FIG. 2). A portion of the platform 118 engages with the hooks 125, 127. The platform 118 is generally parallel to the base portion 124 of the seal segment 105. In an example, the platform 118 of the carrier 112 has a width $W_C$ in the circumferential direction. The carrier hooks 114, 116 have a width $W_H$ in the circumferential direction. The width $W_C$ is greater than the width $W_H$ to permit the platform 118 to engage with the hooks 125, 127 of the seal segment 105. In the illustrated example, the hooks 125, 127 extend in a direction perpendicular to the walls 120, 122. In other examples, the hooks 125, 127 may extend at an angle relative to the walls 120, 122. The axially extending hooks 125, 127 provide engagement with the carrier 112 along all or most of the axial length of the carrier 112. The carrier hooks 114, 116 extend generally perpendicular to the seal segment hooks 125, 127. That is, the carrier hooks 114, 116 extend generally circumferentially, while the seal segment hooks 125, 127 extend generally axially.

In some examples, a wear liner may be arranged between the seal segment 105 and the carrier 112. The wear liner may be a metallic material such as cobalt, for example. The wear liner may be formed from sheet metal. The carrier 112 may be segmented, with each segment engaged with a seal segment 105.

Figure 4:
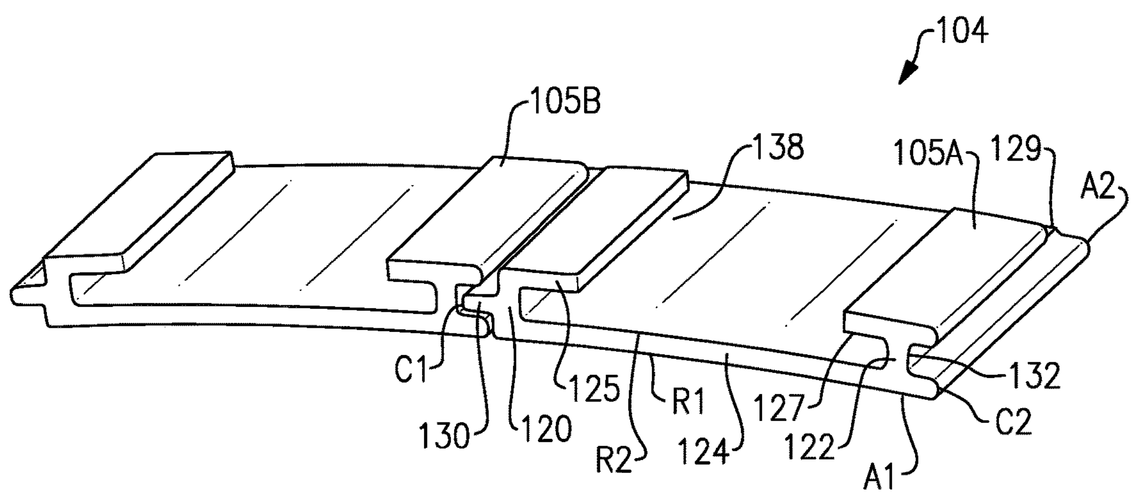
FIG. 4 shows a portion of the exemplary blade outer air seal assembly.

FIG. 4 is a portion of the BOAS assembly 104. The first and second circumferential sides C1, C2 are configured to mate with adjacent seal segments 105. In the illustrated example, the first circumferential side C1 of each seal segment 105A, 105B has a protrusion 130 extending circumferentially outward from the seal segment 105A, 105B. The second circumferential side C2 of each seal segment 105A, 105B has a groove 132 extending circumferentially inward toward the seal segment 105. The protrusion 130 of a seal segment 105A is configured to engage with the groove 132 of an adjacent seal segment 105B. The protrusion 130 and groove 132 may extend along an axial length of the first and second walls 120, 122. The protrusion 130 and groove 132 provide sealing between the first and second circumferential sides C1, C2 of each seal segment 105A, 105B.

In some examples, a seal segment 105 may have either grooves 132 or protrusions 130 at both the circumferential sides C1, C2 for engagement with an adjacent seal segment 105. For example, a first seal segment 105A may have protrusions 130 at both circumferential sides C1, C2, while a second seal segment 105B may have grooves 132 at both circumferential sides C1, C2.

In one example, the protrusion 130 has a height 131, and the groove has a height 137 (shown in FIG. 3). The height 137 is greater than the height 131. The groove 132 forms an inner portion 135 and an outer portion 133 of the second wall 122. The second circumferential side C2 has a thickness T, which includes the inner and outer portions 135, 133, and the groove 132. The first circumferential side C1 has a thickness H. In some examples, the thickness H is the same as the thickness T. The thicknesses H and T may be between about 0.04 and 0.15 inches (1.016-3.81 mm), for example.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets or braids, in tooling, injecting an infiltrant into the tooling, and curing to form a solid composite component. The component may be densified by adding additional material to further stiffen the laminates.

In an embodiment, the BOAS segment 105 is formed from fiber material such as silicon carbide (SiC) braids. In one example, the protrusion 130 and groove 132 are integrally formed from the construction. The protrusion 130 and groove 132 may be formed by wrapping braided plies about a mandrel, then pulling the laminates in the circumferential direction to form the protrusion 130 and groove 132 in one example. In another example, the protrusion 130 and groove 132 may be formed using inner and outer molds that form the protrusion 130 and groove 132.

Figure 5:
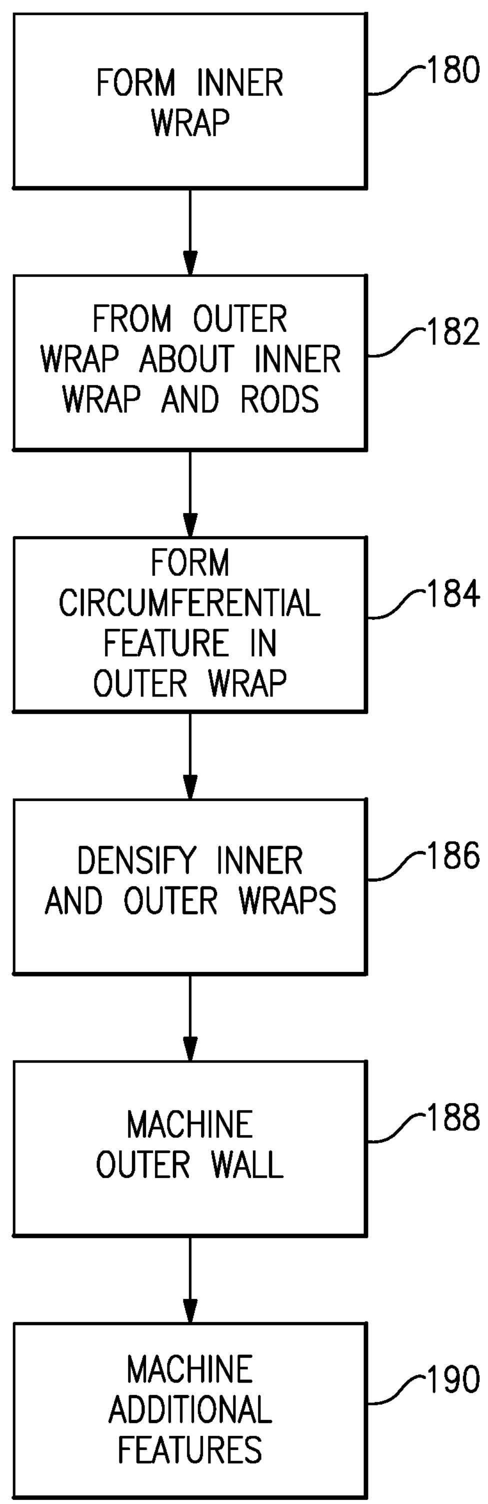
FIG. 5 summarizes an example method of forming a component.

FIG. 5 summarizes an example method of forming a component, such as the seal segment 105. An inner wrap is formed about a mandrel at step 180. An outer wrap is formed about the inner wrap and one or more rods at step 182. The rods are used to form features in the circumferential sides of the outer wrap at step 184. The seal segment 105 may be densified at step 186. The seal segment 105 may be machined to form the final shape at steps 188 and 190. Each of these steps is further described herein.

Figure 6:
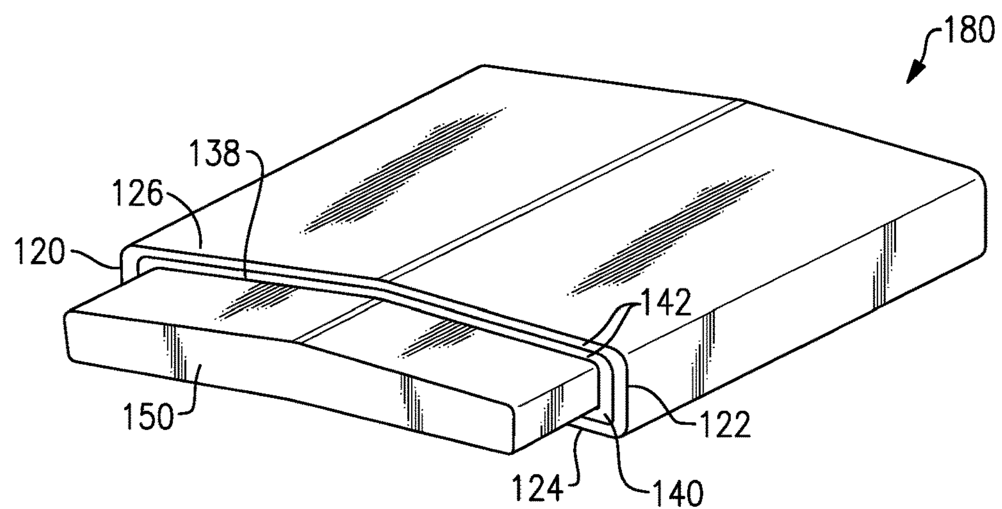
FIG. 6 shows a method step of forming a component.

FIG. 6 illustrates a method step 180 in forming the seal segment 105. An inner wrap 140 is formed about a mandrel 150. The inner wrap 140 is formed by wrapping a plurality of woven or braided plies 142 about the mandrel 150 to form the base portion 124, the first and second walls 120, 122, an outer wall 126, and a passage 138. The shape of the mandrel 150 generally defines the shape of the passage 138. In one example, the inner wrap 140 is formed from at least two plies 142. In a further example, the inner wrap 140 is formed from three or four plies 142. In some examples, additional plies 142 may be used to form the inner wrap 140. The plies 142 may be a silicon carbide matrix composite, for example.

In some examples, the inner wrap 140 is formed by draping woven plies 142 around the mandrel 150 without forming a full loop. In this example, there may be less machining needed after the seal body is formed.

Figure 7:
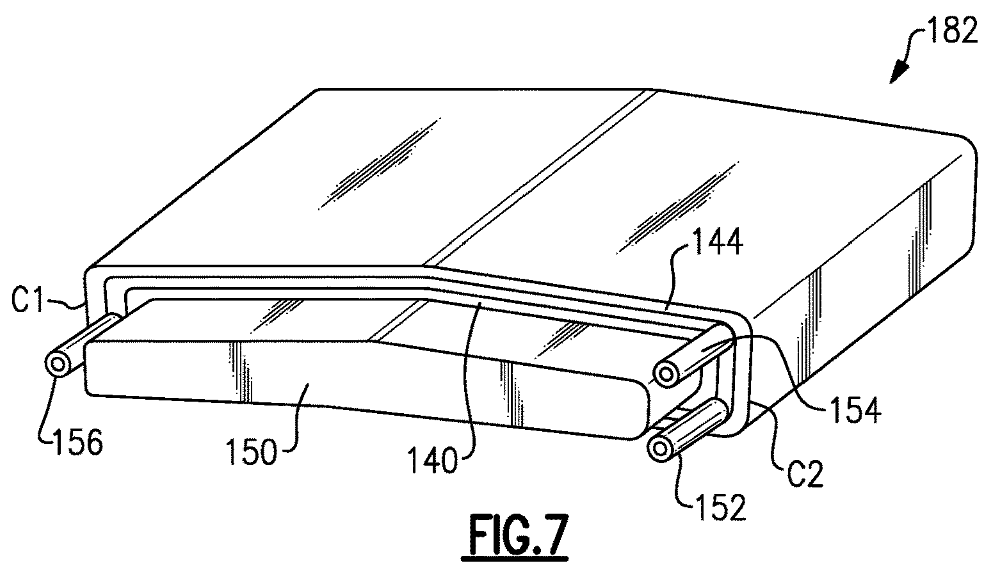
FIG. 7 shows a method step of forming a component.

FIG. 7 illustrates a subsequent method step 182 in forming the seal segment 105. Dowels or rods 152, 154, 156 are placed adjacent the inner wrap 140 near the first and second walls 120, 122, or first and second circumferential sides C1, C2. The rods 152, 154, 156 extend substantially parallel to the mandrel 150 along the axial length of the seal body. In one example, a single rod 156 is arranged at the first circumferential side C1. The rod 156 is configured to form the protrusion 130 (shown in FIG. 4). Two rods, 152, 154 are arranged at the second circumferential side C2. The rods 152, 154 are configured to form the groove 132 (shown in FIG. 4). In one example, the rods 152, 154, 156 have a diameter of at least 0.040 inches (1.016 mm). In an example, the rods 152, 154, 156 have a diameter of less than about 0.30 inches (7.62 mm). The rods 152, 154, 156 may all have the same diameter, or may have different diameters. Once the rods 152, 154, 156 are placed, an outer wrap 144 is formed about the inner wrap 140 and rods 152, 154, 156. The outer wrap 144 is formed from ideally at least two braided plies 142. In one example, the inner and outer wraps 140, 144 together have between 5 and 15 plies 142. In another example, the inner and outer wraps 140, 144 together have between 8 and 12 plies 142.

Figure 8:
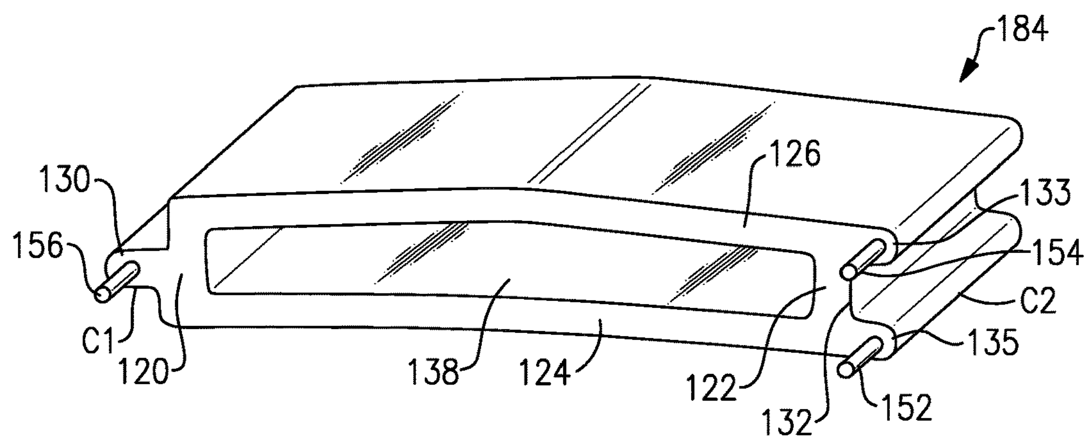
FIG. 8 shows a method step of forming a component.

FIG. 8 illustrates a subsequent method step 184 in forming the seal segment 105. In step 184, the rods 152, 154, 156 are pulled outward from the seal body. The rods 152, 154, 156 are pulled in a generally circumferential direction relative to the seal body. In one example, the rods 152, 154, 156 are pulled in a direction substantially perpendicular to the length of the rods 152, 154, 156. As the rods 152, 154, 156 are pulled outward, the outer wrap 144 is also pulled outward to form the protrusion 130 and groove 132. The groove 132 is formed by the rods 152, 154 forming outer and inner portions 133, 135 adjacent the second wall 122.

In some embodiments, the rods 152, 154, 156 are removed after the step 184. When the rods 152, 154, 156 are removed following step 184, a gap may be left behind in the seal body. In other embodiments, the gap is filled with material added to the seal body.

In another example, the rods 152, 154, 156 are larger than the desired protrusion 130 and groove 132. The rods 152, 154, 156 are then removed, and the excess material in the plies 142 is pressed to form the protrusion 130 and groove 132. In this embodiment, the rods 152, 154, 156 may have a diameter that is between about 33% and 75% of a desired circumferential width of the protrusion 130 and groove 132.

In another example, the rods 152, 154, 156 comprise inner and outer rod portions. The inner rod portion fits within the outer rod portion. After the outer wrap 144 is formed about the rods 152, 154, 156, the outer rod portion is removed. This creates some slack from excess material in the outer wrap 144. The excess material in the outer wrap 144 is pressed to form the protrusion 130 and groove 132. The rods 152, 154, 156 may have a diameter that is between about 33% and 75% of a desired circumferential width of the protrusion 130 and groove 132. In this example, the inner portions of the rods 152, 154, 156 may help control the position of the component while the protrusion 130 and groove 132 are formed.

In each of these embodiments, the rods 152, 154, 156 may be composite, for example. Either triaxial or biaxial braid weave laminates or woven laminates may be used. Although cylindrical rods 152, 154, 156 are shown, the rods may have other shapes, such as a rounded rectangular shape. In particular, the rod shape may avoid sharp edges to prevent fiber breakage in the laminates 142.

Figure 9:
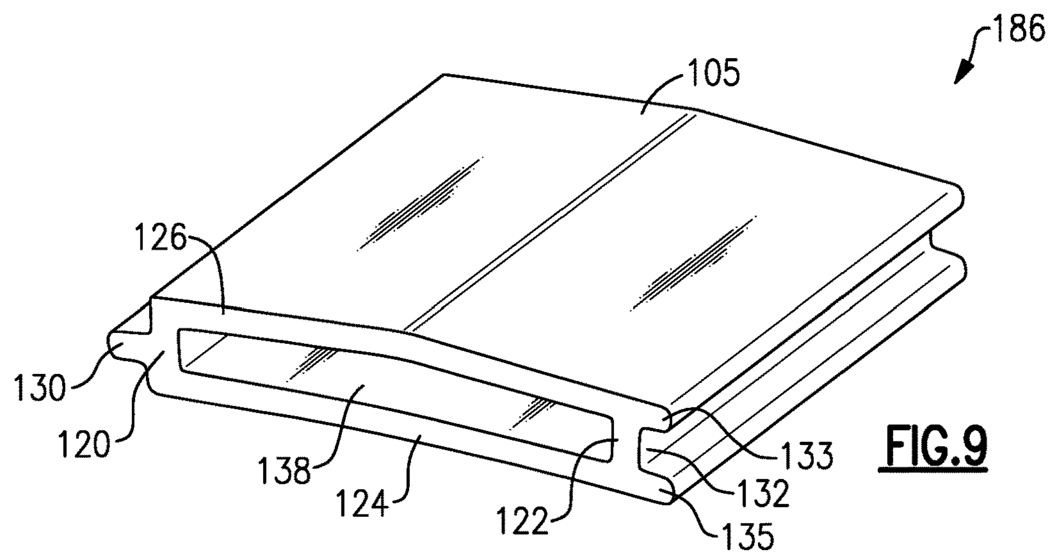
FIG. 9 shows a method step of forming a component.

FIG. 9 illustrates a subsequent method step 186 in forming the seal segment 105. In step 186, the seal body may be densified. Densification generally includes adding additional material to make the laminates stiffer than their free laminated fiber state. Densification increases the density of the laminate material after assembly. An infiltrant is injected into the seal body and cured to form a solid composite component. The infiltrant may be a silicon carbide matrix material, for example.

Figure 10:
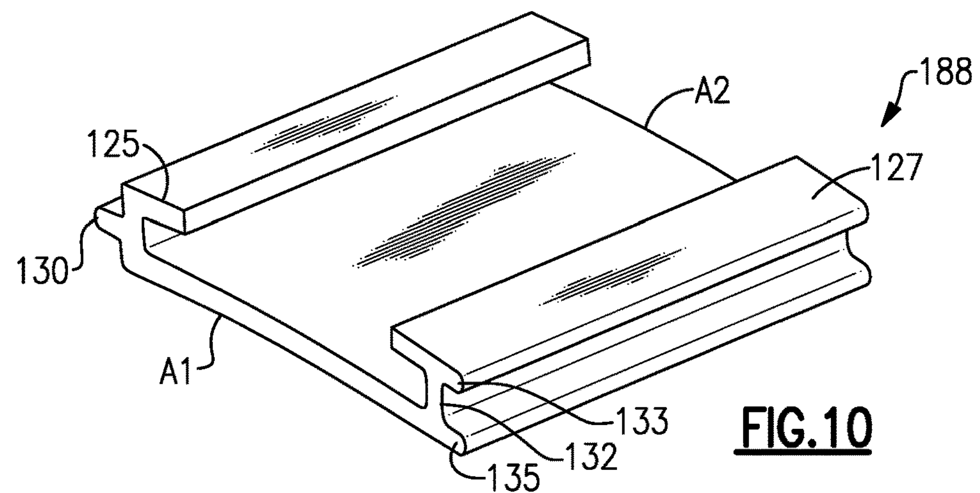
FIG. 10 shows a method step of forming a component.

FIG. 10 illustrates a subsequent method step 188 in forming the seal segment 105. In step 188, the seal body may be machined to form additional features. For example, the outer wall 126 may be machined to form the hooks 125, 127 for engagement with the carrier 112. In one example, at least 50% of the outer wall 126 is removed to form the hooks 125, 127. In a further example, about 50%-80% of the outer wall 126 is removed. This step 188 may be done using ultrasonic machining, for example. The first and second axial sides A1, A2 may also be machined to form a smooth surface. In one example, about 0.050 inches (1.27 mm) is machined from the first and second axial sides A1, A2.

Figure 11:
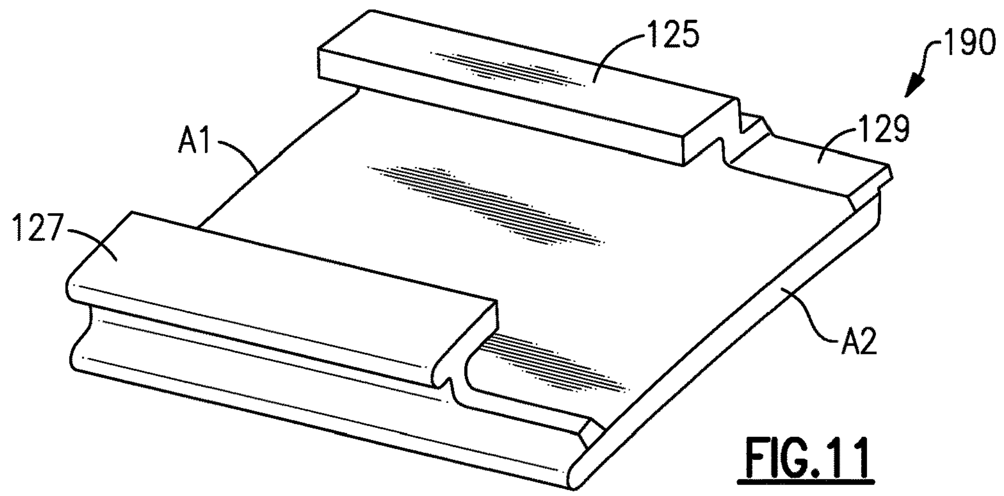
FIG. 11 shows a method step of forming a component.

FIG. 11 illustrates a subsequent method step 190 in forming the seal segment 105. In step 190, additional features may be machined into the seal body to form the final seal segment configuration. In this example, a trailing edge platform 129 is formed near the second axial side A2. The trailing edge platform 129 may be machined, for example. The trailing edge platform 129 is used in the final assembly to seal the trailing edge of the seal segment 105. The trailing edge platform 129 is machined by removing some of the first and second walls 120, 122. In some examples, a leading edge platform may be machined near the first axial side A1. This step 190 may be done using ultrasonic machining, for example.

The disclosed BOAS segment 105 and method of manufacture includes an integrated protrusion and groove arrangement for improved sealing between segments. This arrangement prevents a straight path to the gas path for improved sealing. This arrangement may also provide radiative and convective cooling, reducing the conducted temperature into the metallic carrier. This "shiplap" arrangement may further enable the use of additional flow discouragers or mateface seals. The rods used during manufacturing permit the protrusion and groove to be integrated into the laminate plies, allowing simplified manufacturing of the protrusion and groove features.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of manufacturing a component, comprising:
forming an inner wrap about a mandrel, the inner wrap having first and second walls joined by a base portion and an outer wall;
arranging a rod at each of the first and second walls;
forming an outer wrap about the inner wrap and the rods to form a body;
forming features in the first and second walls; and
machining the body to form a blade outer air seal segment.

2. The method of claim 1, comprising removing the mandrel and the rods.

3. The method of claim 1, comprising densifying the body.

4. The method of claim 3, wherein the densifying comprises injecting an infiltrant into the body to fill voids formed by the rods.

5. The method of claim 1, wherein the machining comprises removing at least 50% of the outer wall.

6. The method of claim 1, wherein the machining comprises removing a portion of the first and second walls to form a trailing edge platform.

7. The method of claim 1, wherein the machining is performed by an ultrasonic machine.

8. The method of claim 1, wherein the inner and outer wraps are formed from fibrous braided or woven plies.

9. The method of claim 8, wherein the inner wrap is formed from at least two plies.

10. The method of claim 8, wherein the body has between 5 and 15 plies.

11. The method of claim 1, wherein the rods extend along an axial length of the first and second walls.

12. The method of claim 1, wherein each of the rods has a diameter of at least 0.040 inches (1.016 mm).

13. The method of claim 1, wherein at least one of the rods comprises an inner rod and an outer rod, wherein the outer rod is removed before the step of forming features in the first and second walls.

14. The method of claim 1, wherein one rod is arranged at the first wall and configured to form a protrusion, and two rods are arranged at the second wall and configured to form a groove.

15. The method of claim 1, wherein the outer wrap and the inner wrap are formed from a ceramic matrix composite material.

16. The method of claim 1, wherein the rods are cylindrical.

17. A method of manufacturing a component, comprising:

forming an inner wrap about a mandrel, the inner wrap having first and second walls joined by a base portion and an outer wall;

arranging a rod at each of the first and second walls;

forming an outer wrap about the inner wrap and the rods to form a body; and forming features in the first and second walls, wherein one rod is arranged at the first wall and configured to form a protrusion, and two rods are arranged at the second wall and configured to form a groove.

18. The method of claim 17, wherein at least one of the rods comprises an inner rod and an outer rod, wherein the outer rod is removed before the step of forming features in the first and second walls.

19. The method of claim 17, wherein the rods extend along an axial length of the first and second walls.

20. A method of manufacturing a component, comprising:

forming an inner wrap about a mandrel, the inner wrap having first and second walls joined by a base portion and an outer wall;

arranging a rod at each of the first and second walls;

forming an outer wrap about the inner wrap and the rods to form a body; and wherein the outer wrap and the inner wrap are formed from a ceramic matrix composite material; and forming features in the first and second walls.

* * * * *